United States Patent

Sakurai

[11] Patent Number: 5,836,272
[45] Date of Patent: Nov. 17, 1998

[54] CYLINDER HEAD OF ENGINE

[75] Inventor: Noriyuki Sakurai, Fujisawa, Japan

[73] Assignee: Isuzu Motors Ltd., Tokyo, Japan

[21] Appl. No.: 501,281

[22] Filed: Jul. 17, 1995

[30] Foreign Application Priority Data

Jul. 19, 1994 [JP] Japan .................................. 6-167037

[51] Int. Cl.⁶ ...................................................... F01P 3/02
[52] U.S. Cl. ................................ 123/41.82 R; 123/41.28
[58] Field of Search ............................. 123/41.74, 41.75, 123/41.76, 41.79, 41.82 R, 41.82 A, 41.39, 41.28

[56] References Cited

U.S. PATENT DOCUMENTS

| 4,455,973 | 6/1984 | Stadler et al. | 123/41.76 |
|---|---|---|---|
| 4,569,313 | 2/1986 | Nobu | 123/41.74 |
| 4,889,080 | 12/1989 | Oguri | 123/41.79 |
| 4,957,068 | 9/1990 | Wagner et al. | 123/41.76 |
| 5,379,729 | 1/1995 | Yonezwa et al. | 123/41.82 R |

FOREIGN PATENT DOCUMENTS

| 538641 | 6/1955 | Belgium | 123/41.82 R |
|---|---|---|---|
| 562883 | 9/1958 | Canada | 123/41.82 R |
| 61-99652 | 6/1986 | Japan . | |
| 64-51728 | 3/1989 | Japan . | |
| 2-125951 | 5/1990 | Japan | 123/41.82 R |
| 6-50147 | 2/1994 | Japan | 123/41.82 R |

*Primary Examiner*—David A. Okonsky
*Attorney, Agent, or Firm*—Staas & Halsey

[57] ABSTRACT

This invention provides a cylinder head capable of efficiently cooling the portion at which a large number of valve ports gather. The present invention provides a cylinder head (20) of an engine equipped with suction and exhaust valve ports (3a, 5a) inside a cooling jacket (8), characterized in that a drain port (11) allowing the cooling water jacket (8) to communicate with the outside of the cylinder head (20) opens in a corner portion at one end portion of a side wall (1a) of the cylinder head, water feed ports (10a) extending along the side wall (1a), opening to the cooling water jacket (8) and communicating with the cooling water jacket of the cylinder block are formed in a cylinder bottom wall (1c), and a partition is so disposed as to divide the portion at which the water feed ports (10a) are open and the portion at which the suction and exhaust valve ports (3a, 5a) are disposed and to guide cooling water from the water feed ports (10a) round the suction and exhaust valve ports (3a, 5a).

7 Claims, 4 Drawing Sheets

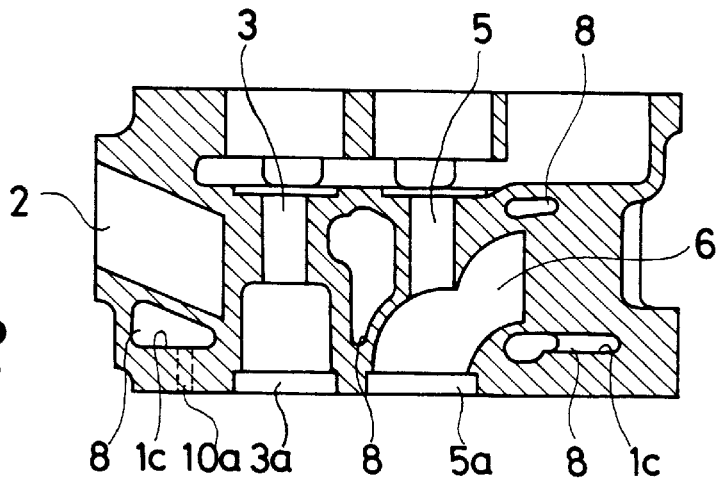
FIG. 2
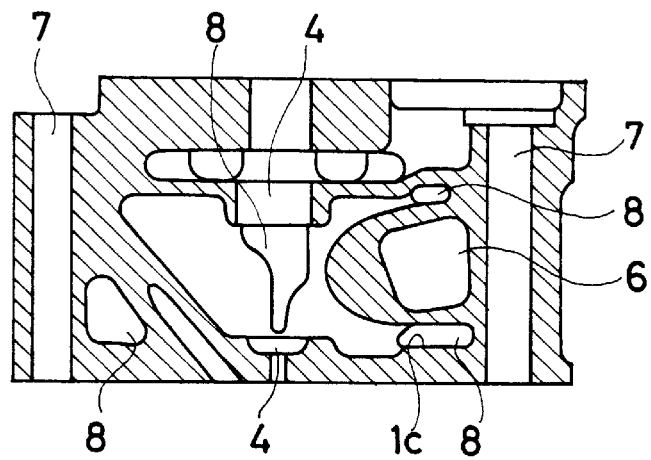
FIG. 3
FIG. 4
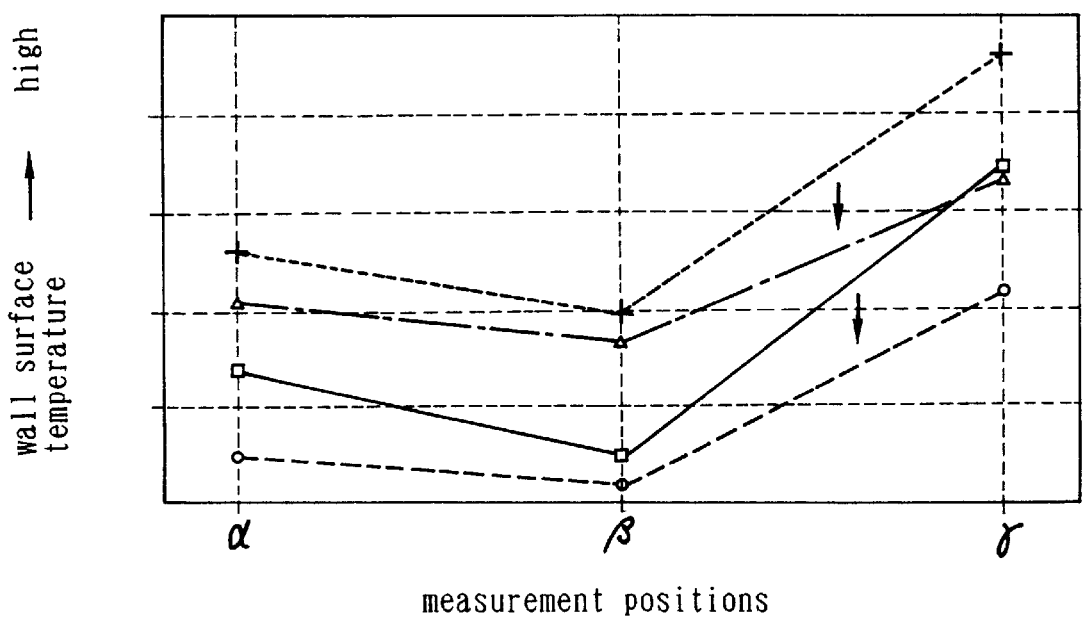

CYLINDER HEAD OF ENGINE

BACKGROUND OF THE INVENTION

This invention relates to a cylinder head that constitutes an engine. More particularly, the present invention provides a cooling structure of a cylinder head capable of effectively cooling the portion, at which a port assembly of suction valve ports and exhaust valve ports is located round a fuel injection nozzle or an ignition plug as the center.

FIG. 6 of the accompanying drawings shows a planar sectional view of a cylinder head of an engine, developed by the inventor. In FIG. 6, the upper half portion represents the plane which includes suction ports and exhaust ports and the lower half portion represents a planar section passing the suction and exhaust valve ports. FIG. 2 is a sectional view taken along a line B—B in FIG. 6 and FIG. 3 is a sectional view taken along a line A—A in FIG. 6.

As shown in FIG. 6, suction valve ports 3a, exhaust valve ports 5a, suction and exhaust ports 2 and 6 communicating with these valve ports, and a fuel injection nozzle (spark plug) fitting hole 4 are formed in such a manner as to correspond to each cylinder in the cylinder head of a multicylinder engine, and a cooling water jacket 8 is formed in such a manner as to encompass these members.

Water feed ports 9 communicating with the cooling water jacket (not shown) of the cylinder body, for guiding cooling water from the cylinder body to the cylinder head 1 are formed in the bottom wall 1c of the cooling water jacket 8. A drain port 11 connected to a cooling water pipe (not shown) for sending cooling water inside the cooling water jacket 8 to a radiator opens to the side wall 1a at one of the end portions of the cylinder head in its longitudinal direction.

In other words, after cooling the cylinder body, cooling water flows through the water feed ports 9 and is introduced into the cooling water jacket 8 on the side of the cylinder head 1. After cooling this cylinder head 1, cooling water is then sent out from the drain port 11 to the radiator, where it is subjected to heat exchange (is cooled), and is again pressure-fed by a cooling water pump (not shown) to the cylinder body side. Thereafter, cooling water circulates inside the engine and cools the necessary portions.

In the cylinder head 1, the portions at which a thermal load attains the highest level are the portions between the valves, that is, between the suction valve ports 3a, between the exhaust valve ports 5a and at the portions between the suction valve ports 3a and the exhaust valve ports 5a where the valve ports gather, in the engine equipped with four valves per cylinder as shown in FIG. 6. Needless to say, this tendency holds true of an engine having two valves per cylinder.

For this reason, large quantities of cooling water must be caused to flow between the valve ports. Recently, however, the diameter of each valve has been increased with a higher engine output, and because a fitting hole 4, etc, for a fuel injection nozzle is formed in the proximity of the valve port, the portions between the valves (indicated by α, β, γ with asterisks) have become narrow. Accordingly, it has become extremely difficult to effectively pass cooling water between the valve ports or the portions near the valve ports.

Besides the water feed ports 9, air vents 10a, 10b open in the bottom wall 1c of the cylinder head (cooling water jacket 8). These air vents 10a, 10b are used to smoothly remove air, that has stayed inside the cooling water jacket of the cylinder body, when cooling water is charged into the cooling water jacket after the cylinder head 1 and the cylinder body are assembled during assembly of the engine.

In the cylinder head shown in FIG. 6, four or five small ports are so disposed as the air vents 10a, 10b as to open along the side wall 1a on the side of the suction ports 2 and along the side wall 1b on the side of the exhaust ports 6. However, it is only after the assembly of the engine or at the time of charging of cooling water after maintenance of the engine (replacing of cooling water, etc) that these air vents 10a, 10b exhibit their original air vent function, and normally, they function as the water feed port of cooling water in the same way as the water feed ports 9. Accordingly, these air vent ports will be hereinafter referred to as the "water feed ports".

On the other hand, there is a design limitation that the drain port 11 of cooling water must be so formed as to open on the side wall at one of the end portions of the cylinder head in its longitudinal direction as shown in FIG. 6 in order to restrict the size of the engine in the longitudinal direction and from the relation with an auxiliary machinery to be fitted to the engine.

It has been confirmed that when the engine having the cooling water introduction path described above is operated, cooling water is supplied from the cylinder body side to the cooling water jacket 8 through the water feed ports 9 and the water feed ports 10a, 10b, but the major proportion of cooling water hardly flows between the valve ports 3a, 5a but flows along the side walls 1a, 1b of the cylinder head as indicated by arrows. This tendency is remarkable particularly on the side where the drain port 11 is formed, and substantially the whole quantity of cooling water flowing from the feed port 10a directly flows towards the drain port 11 as shown in FIG. 6. Moreover, because this flow has a considerably great quantity, it sucks cooling water flowing in from the water feed ports 9 and from the water feed ports 10b on the other side wall side 1b. Accordingly, the flow of cooling water to between the valve ports 3a, 5a is impeded all the more, so that cooling between the suction and exhaust valve ports 3a, 5a becomes insufficient. As a result, a critical problem such as the occurrence of cracks on the lower surface of the cylinder head 1 develops.

Various methods have been therefore proposed so as to solve the cooling defect between the suction and exhaust valve portions or at the portions of the valve stem ports. Japanese Utility Model Application Kokai Publication No. 64-51728, for example, proposes an apparatus which causes cooling water to flow unidirectionally and disposes heat radiation fins at the cylinder head portion. However, this reference does not disclose means for positively cooling the portions between the valves.

On the other hand, Japanese Utility Model Application Kokai Publication No. 61-99652 proposes a structure wherein an outer peripheral passage of cooling water is formed above the lower surface of the cylinder head and divided into an exhaust passage and other passage by a passage partition. However, this proposal cannot be adapted directly to an engine having a large number of cylinders, but involves the problem that the engine structure gets more complicated because a passage must be formed between the valves at which large quantities of heat is particularly likely to be transferred. Therefore, this proposal cannot cope with the engines of the latest type having a large number of valves.

SUMMARY OF THE INVENTION

In an engine having a large number of cylinders each having a plurality of valves disposed round a fuel injection valve or a spark plug as the center, and including exhaust ports on one of the sides and suction ports on the other, it is an object of the present invention to provide a cylinder head capable of efficiently cooling valve port portions by positively supplying cooling water to these valve port portions.

The cylinder head 20 of an engine according to the present invention for accomplishing the object described above is a cylinder head 20 of an engine having suction and exhaust valve ports 3a, 5a disposed inside a cooling water jacket 8, wherein a drain port 11 allowing the cooling water jacket 8 to communicate with the outside of the cylinder head 20 is so disposed as to open in a corner portion at one end of a side wall 1a of the cylinder head, water feed ports 10a opening to the cooling water jacket 8, communicating with the cooling water jacket of the cylinder block and serving also as air vents are formed in the bottom wall 1c of the cylinder head along the side wall 1a, and a partition 21 is disposed so as to positively partition the portion at which the water feed ports 10a are open and the portion at which the suction and exhaust valve ports 3a, 5a are disposed as flow paths and to guide cooling water from the water feed ports 10a round the suction and exhaust valve ports 3a, 5a.

The technical concept of the cylinder head 20 in the present invention is to positively supply cooling water to the portions at which a group of valve ports such as the suction valve ports 3a, the exhaust valve ports 5a and the fuel injection nozzle fitting ports 4 disposed at the center between these valve ports 3a, 5a, are located and at which heat particularly concentrates, and to attain this object, cooling water from the water feed ports 10a and 10b which function also as the air vents is caused to flow through such portions in addition to cooling water from the water feed ports 9 disposed around the group of valves ports.

The problem here is that because the water feed ports 10a, 10b are disposed in the proximity of the side walls 1a and 1b of the cylinder head 20, straight flow paths are easily formed as shown in FIG. 6. When this straight flow path is formed, the quantity of cooling water flowing through this flow path becomes great and forms a large flow. When this large flow is formed, cooling water flowing in from the water feed ports 9 changes its original flowing direction and does not flow towards the portions at which the suction and exhaust valve ports 3a, 5a gather and at which the temperature is likely to become higher. To avoid this problem, the flow paths are formed in such a manner that cooling water flowing in from the water feed ports 10a positively flow towards the grouping portion of the valve ports or the portion near this grouping portion.

A wall surface is formed by utilizing the suction valve port 3a or the member disposed in the proximity of the valve port 3a, preferably a head bolt boss 7, so as to limit the flow path of cooling water by this wall surface.

As shown in FIGS. 1 and 5, a partition 22 is disposed between the side wall 1a on the side in which the drain port 11 is open and the head bolt boss 7 in the proximity of this drain port 11, and another partition 21 is further disposed between the outer wall 20a of the suction valve port 3a on the remote side from the drain port 11 among the suction valve ports 3a (suction port 2) of each cylinder and the head bolt boss 7 in the proximity of the suction valve port 3a.

Further, while the drain port 11 is usually provided at an end portion of the side wall 1a as stated above, alternatively it may be provided in the wall extending perpendicularly to the side wall 1a, namely in the widthwise direction of the engine, at a position in the vicinity of the illustrated drain port 11, namely at a corner portion at one end portion of the side wall 1a. The cooling water flows from one side to the other of the engine, then through the vicinity of the corner at which the two walls intersect, and is discharged through the drain port 11.

Accordingly, cooling water Wa flowing in from the water feed ports 10a is prevented by the partition 21 from flowing directly through the second jacket portion 8b towards the drain port 11. Further, cooling water W flowing in from the water feed ports 9 and 10 is checked by the partition 21 connecting the outer wall 20a of the suction valve port 3a and the head bolt boss 7. Accordingly, cooling water W which has nowhere to go flows between the valve ports 3a and the valve 5a, and the cooling property of the portions between the valve ports (the portions indicted by $\alpha$, $\beta$, $\gamma$ with asterisks) can be drastically improved.

BRIEF DESCRIPTION OF THE DRAWINGS

FIG. 2 is a sectional view taken along a line B—B in FIGS. 1 and 6;

FIG. 3 is a sectional view taken along a line A—A in FIGS. 1 and 6;

FIG. 4 is a graph showing the cooling effect of the cylinder head according to FIGS. 1–5 of the present invention in comparison with that of the cylinder head according to FIG. 6;

DESCRIPTION OF THE PREFERRED EMBODIMENTS

Next, preferred embodiments of the present invention will be explained with reference to the accompanying drawings.

Figure 1:
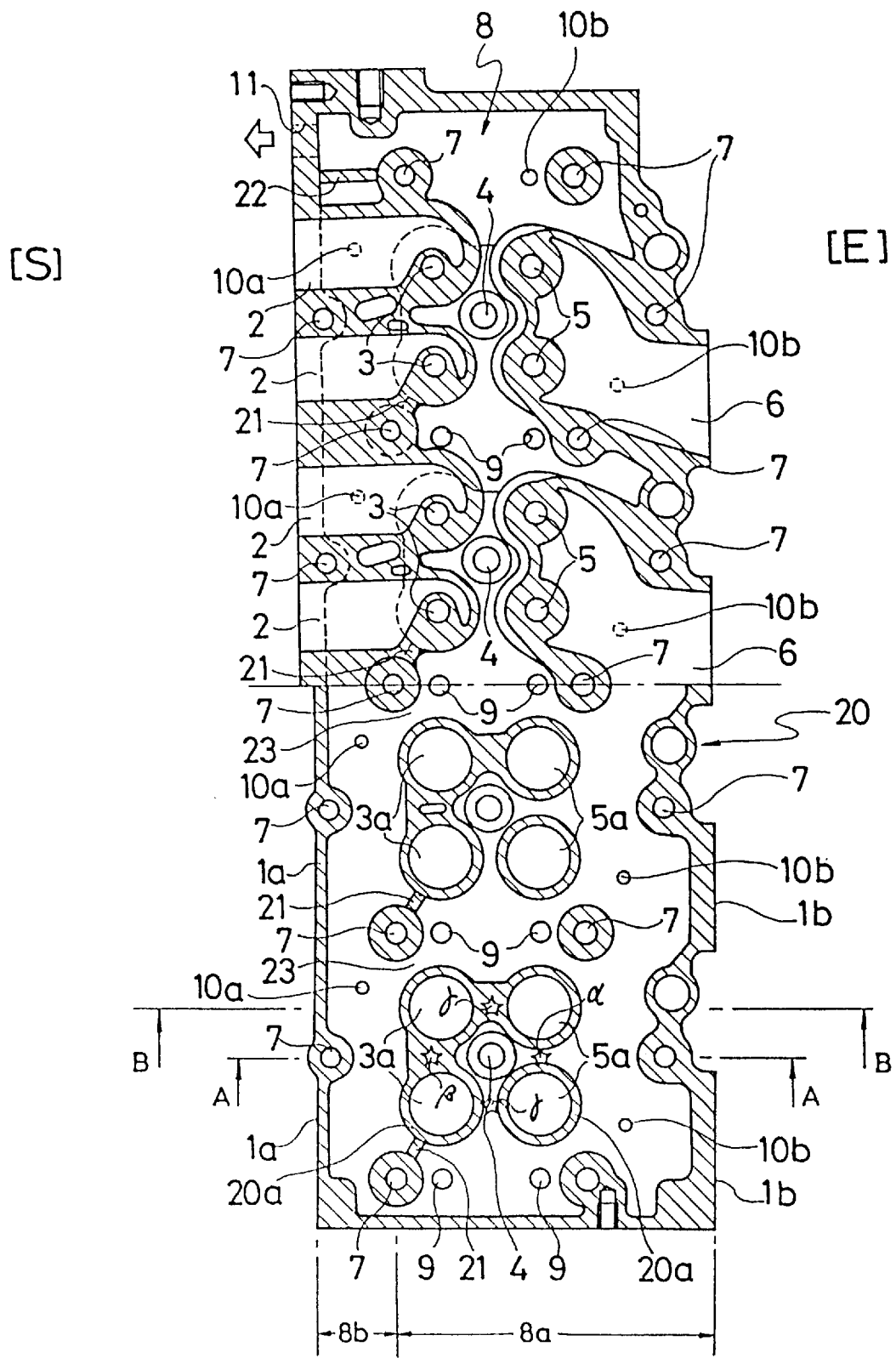
FIG. 1 is a planar sectional view of a cylinder head according to an embodiment of the present invention, wherein the upper and lower halves show sections at different positions.
Figure 6:
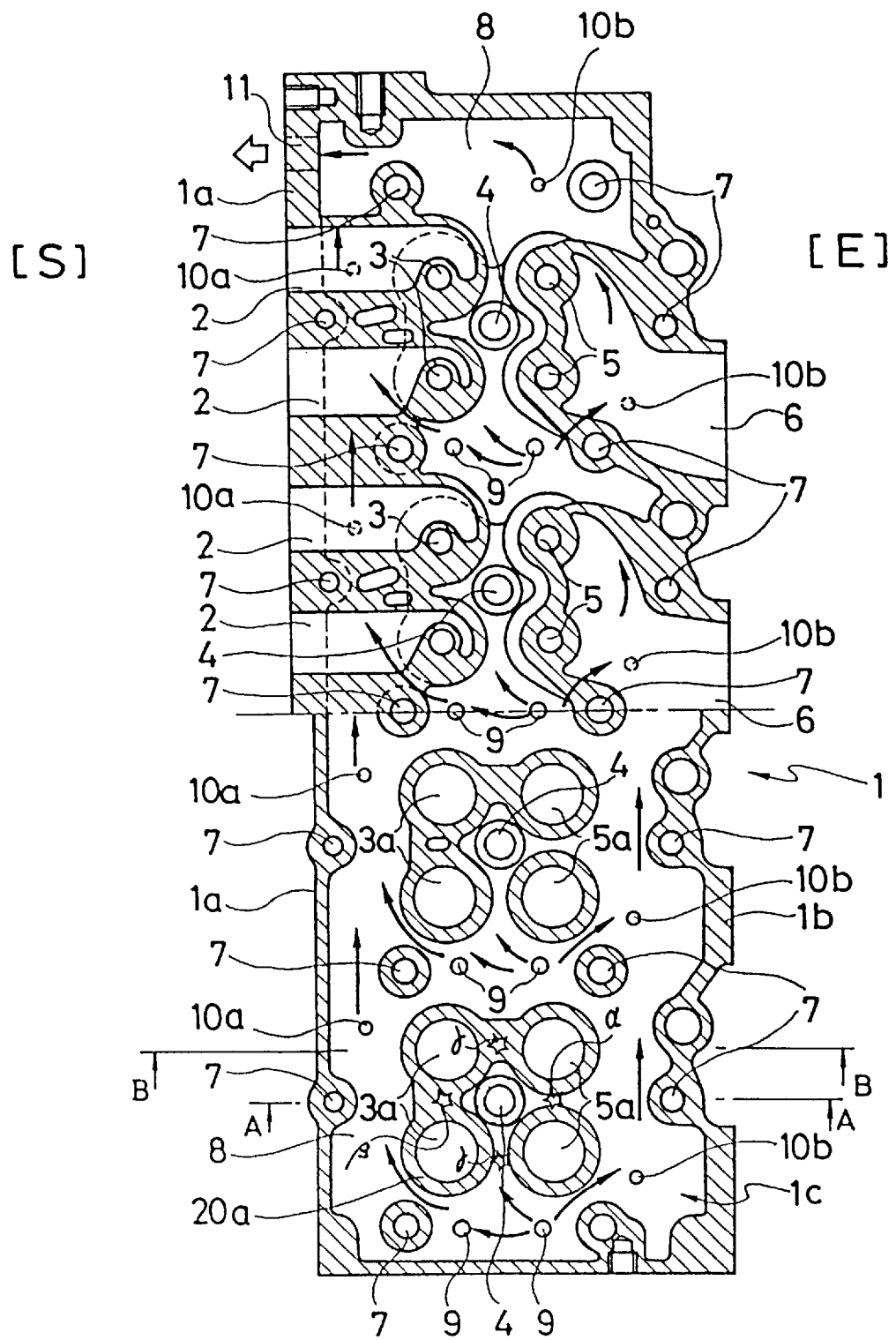
FIG. 6 is a view of a cylinder head, in which the flow of cooling water in the cylinder head is along side walls.

FIG. 1 shows a cylinder head 20 obtained by improving a cylinder head 1 shown in FIG. 6 using the FIG. 6 cylinder head as the basic structure. The drawing shows the same sectional portion, and the same reference numeral is used to identify the same component.

In the present invention, a suction port 2 is disposed on the suction side [S] on one of the sides and an exhaust port 6 is disposed on the exhaust side [E] on the other side. A drain port 11 opens at the end portion of one of the side walls 1a. A suction valve port 3a is disposed on the side wall side 1a and an exhaust valve port 5a is disposed on the other side wall side 1b opposing the former. A fuel injection nozzle fitting port 4 is disposed at the central portion of these valve ports 3a and 5a, and these ports together constitute a valve port group.

As shown in FIGS. 2 and 3, a valve stem hole 3 is disposed above the suction valve port 3a, and another valve stem hole 5 is formed above the exhaust valve port 5a. A cooling water jacket 8 is disposed in such a manner as to encompass these suction and exhaust valves. Feed ports 10 (10a, 10b) for cooling water, which also function as air vents communicating with a cooling water jacket disposed on the cylinder body, open in this jacket 8.

The outer wall 20a of each suction valve port 3a and a member formed in the proximity of this outer wall 20a, that is, a head bolt boss 7 in this embodiment, are interconnected by a partition 21 in such a manner as to cut off a passage which short-passes from the water feed port 9 to a portion near the side wall 1a through a portion near the side wall 20b.

A partition 22 is disposed between the head bolt boss 7 in the proximity of the drain port 11 opening to the end portion of the side wall 1a and the side wall 1a and cuts off the end portion of a passage formed on the side of the second cooling water jacket portion 8b in which the water feed ports 10a are arranged.

The partition 21 must be located at a position such that it can close the portion between the suction valve port 3a and a member so disposed in the proximity of the former as to protrude into the jacket 8, that is, between the suction valve port 3a and the head bolt boss 7 in this embodiment, and directs the flow of cooling water flowing out from the water feed port 9 disposed in the vicinity of the suction valve port 3a towards the suction valve port 3a and the outer wall 20a of the exhaust valve port 5a.

Since the partition 21 is disposed on the side of the suction valve port 3a as described above, the flow path of cooling water in the jacket 8 is roughly divided into a first cooling water jacket portion 8a and a second cooling water jacket portion 8b in the longitudinal direction of the cylinder head 20, inside the cylinder head.

In other words, the first cooling water jacket portion 8a and the second jacket portion 8b extend in parallel with each other in the longitudinal direction of the cylinder head 20 and moreover, they are connected at several positions by the flow path 23. This flow path 23 is positioned very near to the water feed port 9 communicating with the cylinder block. This structure makes it possible to positively jet cooling water Wa supplied from the water feed portion 10a as if it were from the nozzle, to the outer wall 20a of the suction and exhaust valve ports 3a, 5a, from which heat must be removed, through the flow path 23.

The partitions 21 and 22 broadly divide the jacket 8 formed in the cylinder head 20 into two portions in the longitudinal direction and play the role of forming two flow paths of cooling water comprising the first cooling water jacket portion 8a and the second cooling water jacket portion 8b as described above. These partitions 21 and 22 are molded integrally with the cylinder head when the cylinder head is casted. The partitions 21 and 22 may be made of the same material as, or the different material from, that of the cylinder head.

As described above, the portion between the outer side wall 20a on the side of the suction valve port 3a and the head bolt boss 7 formed in the proximity of this suction valve port 3a is connected by the partition 21 so as to close the flow path formed in the proximity of this head bolt boss 7. Accordingly, the first cooling water jacket portion 8a and the second cooling water jacket portion 8b are substantially separated from each other with the exception of the flow path 23, and form the separated flow paths of the cooling water.

Figure 5:
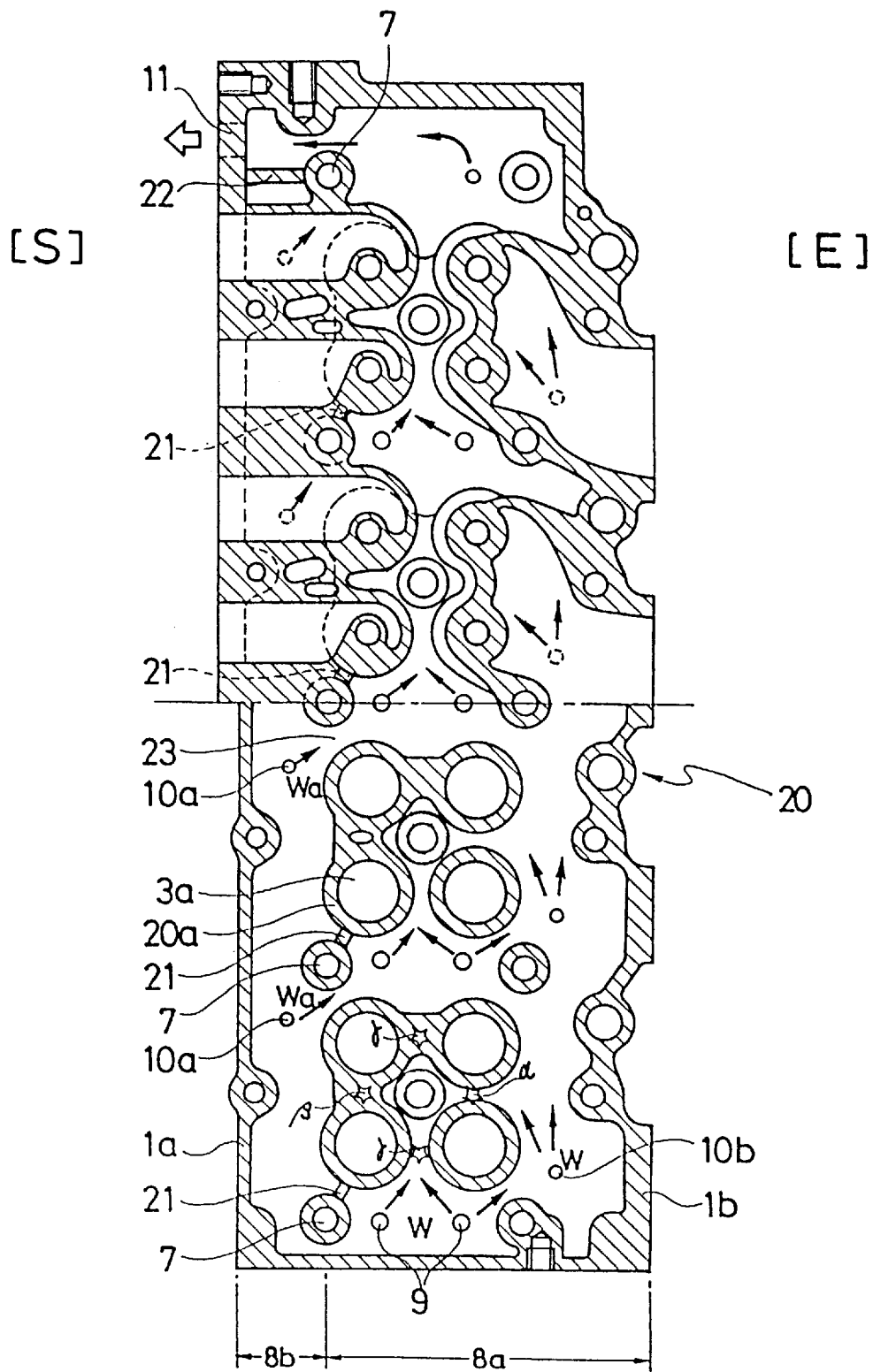
FIG. 5 is a view showing the flow of cooling water in the cylinder head according to the present invention.

FIG. 5 is a plan view showing the flow of cooling water flowing inside the cooling jacket 8 of the cylinder head 20 according to the present invention. As shown in this drawing, cooling water W supplied from the water feed port 9 flows in the direction of the outer wall 20a of the valve ports 3a, 5a without changing its direction due to cooling water Wa supplied from the water feed port 10a, and positively cools the portion at which the valve ports gather together and at which heat of α, β, γ indicated by asterisks (*) is likely to gather.

Because the flow path 23 opens near the water feed port 10a, cooling water Wa jetted from this water feed port 10a is guided from this flow path 23 towards the valve ports 3a, 5a, joins with cooling water W described above and can efficiently cool the portions between the valves.

FIG. 4 shows the result of measurement of the wall surface temperature of the portions between the valves α or γ (see FIGS. 1, 5, 6) when the conventional cylinder head 1 is used and when the cylinder head 20 according to the present invention is used, respectively.

In the diagram, the points plotted by (□) and (+) indicate the measurement points by using the conventional cylinder head, and represent the wall surface temperatures indicated by α, ⊖ and γ when the cooling water temperature was at a low temperature of about 80° C. and at a high temperature of about 100° C., respectively.

The points plotted by (○) and (Δ) indicate the measurement points at the same positions by using the cylinder head 20 of the present invention, and represent the wall surface temperature at each measurement point at the low temperature of about 8° C. and the high temperature of about 100° C. for cooling water, respectively.

As can be understood from this diagram, the wall surface temperature becomes lower at all the measurement points irrespective of the temperatures of cooling water when the present invention is employed.

It has been confirmed that the structure of the present invention, wherein cooling water Wa from the feed port 10a is positively guided towards the valve ports 3a, 5a, provides a by far higher cooling effect than the conventional structure wherein cooling water Wa from the feed port 10a flows out towards the drain port 11, and can effectively cool particularly the portions between the valves.

The cylinder head according to the present invention is the cylinder head 20 of the engine equipped with the suction and exhaust valve ports 3a, 5a disposed inside the cooling water jacket 8 wherein the drain port 11 allowing the cooling water jacket 8 to communicate with the outside of the cylinder head 20 is opened at one of the end portions of the side wall 1a of the cylinder head, the water feed port 10a is formed in the bottom wall 1c of the cylinder head in such a manner as to extend along the side wall 1a, to open to the cooling water jacket 8 and to communicate with the cylinder head bottom wall 1c, the portion at which the water feed port 10a is open and the portion at which the suction and exhaust valves 3a, 5a are disposed are partitioned, and the partition wall 21 is disposed so as to guide cooling water from the water feed port 10a around the suction and exhaust valves 3a, 5a.

Accordingly, since cooling water Wa supplied from the water feed port 10a and cooling water W supplied from the water feed port 9 are guided to the portion, on the side of the outer wall 20a, at which the suction and exhaust valve ports 3a, 5a gather, this portion can be cooled concentratedly.

As described, the water jacket 8 is separated into the second cooling water jacket portion 8b at which the water feed port 10a is open and the first cooling water jacket portion 8a at which the water feed port 9 is open. Therefore, cooling water W, Wa can be guided in a missile firing manner to the portion which receives high heat and can drastically cool this portion. Consequently, the present invention can effectively cool the engine having a large number of valves as the group and can eliminate the portion on which the thermal stress concentrates.

Further, although the drain port 11 is provided at an end portion of the side wall 1a as shown in FIG. 1, alternatively it may be provided in a wall extending in a direction crossing the side wall 1a, namely in the widthwise direction of the engine, at a position in the vicinity of the corner at which the side wall 1a and the other wall intersect, namely in a corner portion at an end of the side wall 1a, and even in this latter instance, too, the cooling water does not undergo a short-path flow but can be effectively applied according to the present invention.

What is claimed is:

1. A cylinder head of an engine having a cylinder block with a cylinder block cooling water jacket, the cylinder head extending in a longitudinal direction and having an outer periphery defined by side walls, comprising:

a cylinder head cooling water jacket provided along an upper wall of the cylinder head, said cylinder head cooling water jacket comprising first and second portions with the first portion having valve port groups therein, each valve port group comprising an intake valve port and an exhaust valve port with the valve port groups being spaced in the longitudinal direction of the cylinder head, the second portion being bounded by the first portion and one of the side walls, the second portion having a downstream end and having first cooling water ports therein with the first cooling water ports communicating with the cylinder block cooling water jacket such that water flows from the first cooling water ports toward the downstream end of the second portion;

second cooling water ports formed in the vicinity of respective valve port groups in the first portion;

a drain port opening to the downstream end of the second portion; and a partition provided in the vicinity of but upstream from the drain port, the partition projecting from the side wall bounding the second portion, towards the first portion whereby cooling water flowing in the second portion is caused to flow toward the first portion.

2. A cylinder head as claimed in claim 1, wherein the drain port is located in a corner of the cylinder head cooling water jacket.

3. A cylinder head as claimed in claim 1, wherein the partition is formed of the same material as the cylinder head and formed integrally with the cylinder head at the time of casting the cylinder head.

4. A cylinder head as claimed in claim 1, wherein the partition is formed of a material different from a material of the cylinder head and is formed integrally with the cylinder head at the time of casting the cylinder head.

5. A cylinder head of an engine having a cylinder block with a cylinder block cooling water jacket, the cylinder head extending in a longitudinal direction and having an outer periphery defined by side walls, comprising:

a cylinder head cooling water jacket provided along an upper wall of the cylinder head, said cylinder head cooling water jacket comprising first and second portions with the first portion having valve port groups therein, each valve port group comprising an intake valve port and an exhaust valve port with the valve port groups being spaced in the longitudinal direction of the cylinder head, the second portion being bounded by the first portion and one of the side walls such that the second portion occupies a corner of the cylinder head cooling water jacket, the second portion having a downstream end and having first cooling water ports therein with the first cooling water ports communicating with the cylinder block cooling water jacket such that water flows from the first cooling water ports toward the downstream end of the second portion;

a head bolt boss arranged in the vicinity of each valve port group;

second cooling water ports formed in the vicinity of respective valve port groups in the first portion and communicating with the cylinder block cooling water jacket;

a drain port opening in the corner of the cylinder head cooling water jacket, to the downstream end of the second portion;

a first partition provided in the vicinity of but upstream from the drain port, the first partition projecting from the side wall bounding the second portion, towards the first portion; and a second partition extending from each valve port group to the head bolt boss arranged in the vicinity of the valve port group such that cooling water flowing in the second portion is guided toward the first portion by the first partition and by the second partition.

6. A cylinder head as claimed in claim 5, wherein the first partition is formed of the same material as the cylinder head and formed integrally with the cylinder head at the time of casting the cylinder head.

7. A cylinder head as claimed in claim 5, wherein the first partition is formed of a material different from a material of the cylinder head and is formed integrally with the cylinder head at the time of casting the cylinder head.

* * * * *